US012333262B2

(12) United States Patent
Blau-McCandliss et al.

(10) Patent No.: US 12,333,262 B2
(45) Date of Patent: Jun. 17, 2025

(54) CUSTOM TEXT GENERATION BASED ON SKILL PROFILE

(71) Applicant: Learning Squared, Inc., Sunnyvale, CA (US)

(72) Inventors: Vera Blau-McCandliss, Stanford, CA (US); Carey Lee, Redwood City, CA (US); Ashish Jhalani, Goregoan East (IN)

(73) Assignee: Learning Squared, Inc., Sunnyvale, CA (US)

( * ) Notice: Subject to any disclaimer, the term of this patent is extended or adjusted under 35 U.S.C. 154(b) by 303 days.

(21) Appl. No.: 17/913,277

(22) PCT Filed: Apr. 9, 2021

(86) PCT No.: PCT/US2021/070374
§ 371 (c)(1),
(2) Date: Sep. 21, 2022

(87) PCT Pub. No.: WO2021/207768
PCT Pub. Date: Oct. 14, 2021

(65) Prior Publication Data
US 2023/0142574 A1 May 11, 2023

Related U.S. Application Data

(60) Provisional application No. 63/008,293, filed on Apr. 10, 2020.

(51) Int. Cl.
*G06F 40/56* (2020.01)
*G06F 40/109* (2020.01)

(52) U.S. Cl.
CPC .......... *G06F 40/56* (2020.01); *G06F 40/109* (2020.01)

(58) Field of Classification Search
CPC ...... G06F 3/1206; G06F 16/22; G06F 16/337; G06F 16/9535; G06F 17/18;
(Continued)

(56) References Cited

U.S. PATENT DOCUMENTS 10,025,773 B2 * 7/2018 Bordawekar ......... G06F 40/216
10,535,018 B1 * 1/2020 Kenthapadi .............. G06N 7/01
(Continued)

FOREIGN PATENT DOCUMENTS

| CN | 115552433 | 12/2022 |
| IN | 202217063700 | 2/2023 |
| WO | WO-2021207768 A1 | 10/2021 |

OTHER PUBLICATIONS

"International Application Serial No. PCT/US2021/070374, International Search Report mailed Jun. 8, 2021", 2 pgs.
(Continued)

*Primary Examiner* — Gerald Gauthier
(74) *Attorney, Agent, or Firm* — Schwegman Lundberg & Woessner, P.A.

(57) ABSTRACT

A text generation machine performs a method of generating custom text. The text generation machine accesses a skill profile that specifies one or more skills of a user. The text generation machine determines a set of one or more words based on the one or more skills specified by the skill profile. The text generation machine then generates custom text for the user, and the generated custom text includes the determined set of words. The text generation machine then causes presentation of the generated custom text. A trainer machine performs a method of training a learning machine, based on one or more reference stories, to perform all or part of the method of generating custom text. The trained learning machine is configured to generate custom text based on one
(Continued)

or more inputted words, which may be selected or otherwise determined based on a user's skill profile.

19 Claims, 11 Drawing Sheets

(58) Field of Classification Search
CPC .... G06F 40/109; G06F 40/205; G06F 40/216; G06F 40/232; G06F 40/253; G06F 40/263; G06F 40/268; G06F 40/284; G06F 40/30; G06F 40/56; G06F 16/148; G06N 3/044; G06N 3/08; G06N 7/01; G06N 20/00; G06N 20/20; G06Q 10/06398; G06Q 50/01; G06Q 50/2057; G06Q 10/10; G09B 5/06; G09B 5/12; G09B 7/02; G09B 7/04; G09B 17/006; G09B 19/04; G09B 19/06; G09B 5/00; G10L 15/18; H04N 21/458; H04W 4/02; H04W 4/21

See application file for complete search history.

(56) References Cited

U.S. PATENT DOCUMENTS

| | | | | |
|---|---|---|---|---|
| 10,559,298 | B2* | 2/2020 | Chintalapati | G06F 40/253 |
| 10,984,365 | B2* | 4/2021 | Fang | G06Q 10/06398 |
| 11,069,253 | B2* | 7/2021 | Basumotari | G09B 7/04 |
| 11,114,090 | B1* | 9/2021 | Hertschuh | G10L 15/1822 |
| 11,122,343 | B2* | 9/2021 | Kokku | H04N 21/458 |
| 11,657,225 | B2* | 5/2023 | Srinivasan | G06F 40/284 704/9 |
| 11,663,536 | B2* | 5/2023 | Shi | G06Q 10/06398 705/7.14 |
| 11,741,306 | B2* | 8/2023 | Galley | G06N 3/044 704/9 |
| 11,769,012 | B2* | 9/2023 | Beaver | G10L 15/18 704/9 |
| 2004/0023191 | A1 | 2/2004 | Brown et al. | |
| 2007/0048698 | A1 | 3/2007 | Wang et al. | |
| 2008/0038707 | A1* | 2/2008 | Banhazl | G09B 5/06 434/350 |
| 2008/0059145 | A1 | 3/2008 | Wood et al. | |
| 2008/0254429 | A1* | 10/2008 | Woolf | G09B 7/02 706/45 |
| 2008/0254431 | A1* | 10/2008 | Woolf | G09B 5/00 434/322 |
| 2011/0111377 | A1* | 5/2011 | Dekkers | G09B 17/006 434/156 |
| 2011/0313757 | A1* | 12/2011 | Hoover | G06F 40/205 704/9 |
| 2014/0099082 | A1 | 4/2014 | Miller | |
| 2014/0330669 | A1 | 11/2014 | Bruce et al. | |
| 2015/0331939 | A1* | 11/2015 | Burgmeier | G06F 16/148 707/733 |
| 2016/0019816 | A1* | 1/2016 | Parry | G09B 5/06 704/2 |
| 2016/0124933 | A1* | 5/2016 | Takeuchi | G06F 40/268 706/12 |
| 2016/0162466 | A1* | 6/2016 | Munro | G06F 40/284 704/9 |
| 2016/0329048 | A1 | 11/2016 | Li et al. | |
| 2017/0154307 | A1* | 6/2017 | Maurya | G06F 16/9535 |
| 2017/0221164 | A1* | 8/2017 | Loof | G06Q 50/2057 |
| 2017/0300477 | A1* | 10/2017 | Long | G06F 16/22 |
| 2017/0323205 | A1* | 11/2017 | Gonzalez | G06F 40/253 |
| 2017/0337263 | A1* | 11/2017 | Muralidharan | H04W 4/21 |
| 2018/0017405 | A1* | 1/2018 | Chen | H04W 4/02 |
| 2018/0130156 | A1* | 5/2018 | Grau | G06Q 50/2057 |
| 2018/0190141 | A1* | 7/2018 | Basumotari | G09B 19/06 |
| 2018/0247357 | A1* | 8/2018 | Gaskin | G06F 3/1206 |
| 2018/0253655 | A1* | 9/2018 | Wang | G06Q 50/01 |
| 2018/0330232 | A1* | 11/2018 | Ronayne | G09B 5/00 |
| 2019/0065458 | A1* | 2/2019 | Brunet | G06Q 50/01 |
| 2019/0122578 | A1* | 4/2019 | Wasserman | G09B 19/06 |
| 2019/0158671 | A1* | 5/2019 | Feast | G06Q 10/10 |
| 2019/0332670 | A1* | 10/2019 | Zorzin | G06F 40/30 |
| 2019/0340945 | A1* | 11/2019 | Malhotra | G09B 5/12 |
| 2020/0005194 | A1* | 1/2020 | Rao | G06N 20/20 |
| 2020/0051178 | A1* | 2/2020 | Albouyeh | G06N 7/01 |
| 2020/0111488 | A1* | 4/2020 | Ray | G10L 15/22 |
| 2020/0125634 | A1* | 4/2020 | Liu | G06F 40/263 |
| 2020/0219489 | A1* | 7/2020 | Stephenson | G06F 40/232 |
| 2020/0242197 | A1* | 7/2020 | Srinivasan | G06N 3/08 |
| 2020/0242958 | A1* | 7/2020 | Tufail | G06F 17/18 |
| 2020/0320982 | A1* | 10/2020 | Larson | G06F 40/56 |
| 2020/0334329 | A1* | 10/2020 | Chen | G06F 40/263 |
| 2021/0073337 | A1* | 3/2021 | Jiang | G06F 16/3329 |
| 2021/0192288 | A1* | 6/2021 | Cao | G06N 20/00 |
| 2021/0192421 | A1* | 6/2021 | Raghavan | G06F 16/337 |
| 2021/0264812 | A1* | 8/2021 | Phillips | G09B 5/06 |
| 2023/0142574 | A1* | 5/2023 | Blau-McCandliss | G09B 19/04 704/9 |

OTHER PUBLICATIONS

"International Application Serial No. PCT/US2021/070374, Written Opinion mailed Jun. 8, 2021", 4 pgs.
"International Application Serial No. PCT/US2021/070374, International Preliminary Report on Patentability mailed Oct. 20, 2022", 6 pgs.
"Indian Application Serial No. 202217063700, First Examination Report mailed Mar. 10, 2023", 6 pgs.
"Indian Application Serial No. 202217063700, Response filed Dec. 6, 2023 to First Examination Report mailed Mar. 10, 2023", 27 pgs.

* cited by examiner

CUSTOM TEXT GENERATION BASED ON SKILL PROFILE

RELATED APPLICATION

This application is a U.S. National Stage Filing under 35 U.S.C. 371 from International Application No. PCT/US2021/070374, titled "CUSTOM TEXT GENERATION BASED ON SKILL PROFILE" and filed on Apr. 9, 2021, and published as WO 2021/207768 on Oct. 14, 2021, which claims the priority benefit of U.S. Provisional Patent Application No. 63/008,293, titled "CUSTOM TEXT GENERATION BASED ON SKILL PROFILE" and filed Apr. 10, 2020, each of which is incorporated herein by reference in its entirety.

TECHNICAL FIELD

The subject matter disclosed herein generally relates to the technical field of special-purpose machines that facilitate text generation, including software-configured computerized variants of such special-purpose machines and improvements to such variants, and to the technologies by which such special-purpose machines become improved compared to other special-purpose machines that facilitate text generation. Specifically, the present disclosure addresses systems and methods to provide custom text based on a skill profile.

BACKGROUND

A machine may be configured to interact with one or more users of the machine (e.g., a computer or other device) by presenting text. For example, the machine may receive a user's selection of a document that contains some text, and the machine may respond by causing display of the user-selected document on a display screen, resulting in presentation of the text to the user.

BRIEF DESCRIPTION OF THE DRAWINGS

Some embodiments are illustrated by way of example and not limitation in the figures of the accompanying drawings.

DETAILED DESCRIPTION

Figure 1:
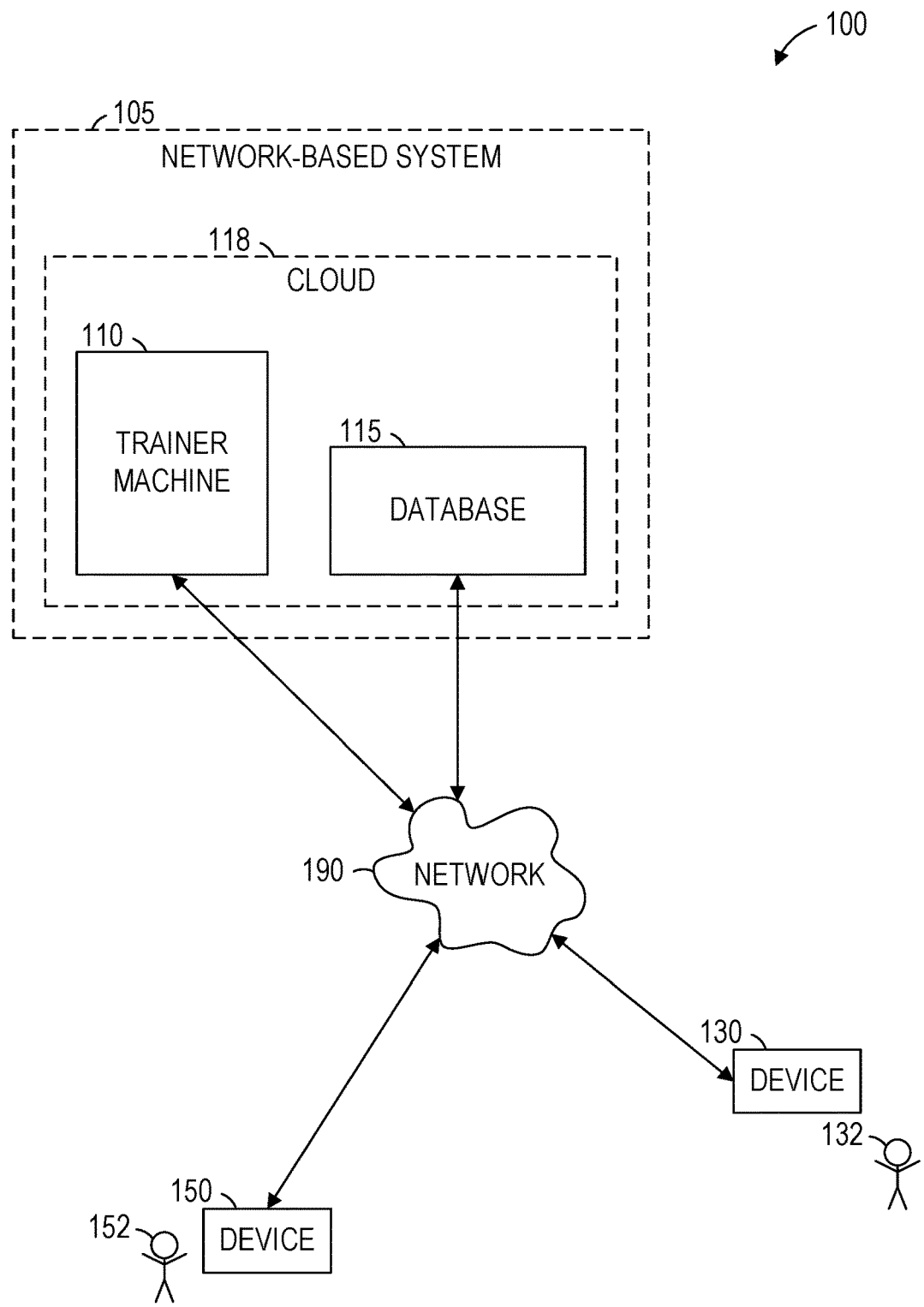
FIG. 1 is a network diagram illustrating a network environment suitable for custom text generation based on a skill profile, according to some example embodiments.

Example methods (e.g., algorithms) facilitate custom text generation based on a skill profile of a user, and example systems (e.g., special-purpose machines configured by special-purpose software) are configured to facilitate custom text generation based on a skill profile of the user. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

A machine (e.g., a mobile device or other computing machine) is specially configured (e.g., by suitable hardware modules, software modules, or any suitable combination thereof) to behave or otherwise function as a custom text generator. The machine accesses a skill profile of a user. The skill profile specifies a set of one or more skills (e.g., language skills, such as literacy skills) that correspond to the user (e.g., skills in which the user is weak, strong, or any suitable combination thereof). The machine determines (e.g., selects or updates) a set of words that correspond to the user based on the set of language skills (e.g., literacy skills) specified by the skill profile. The machine generates custom text that includes the set of words by inputting the set of words into a learning machine (e.g., a generator module or other AI module) that is trained based on a reference set of documents to generate custom text based on one or more inputted words. The machine then causes presentation of the generated custom text. As used herein, "literacy skill" refers to a skill used in reading, writing, or both, with respect to a language. As used herein, "language skill" refers to a skill used in reading, writing, listening, speaking, signing, interpreting signs, or any suitable combination thereof, with respect to a language.

For example, the machine may generate and present a story to the user, and the story may contain one or more specific words that have been selected by the machine based on the skill profile of the user. The selected one or more words may have a characteristic, such as the presence or absence of an alphabetic letter (e.g., "c" or "x") or the presence or absence of a phoneme (e.g., a "th" sound, a "ch," sound, an "r" sound, or an "l" sound). The characteristic may also be the presence or absence of a combination of letters (e.g., an "ing" suffix). Furthermore, a characteristic of a word may correspond to a skill (e.g., a skill in which the user has difficulty or mastery). For example, the user may have difficulty pronouncing a phoneme, and practice by the user in pronouncing that phoneme may improve the skill of pronouncing that phoneme. Accordingly, the skill of pronouncing that phoneme may be specified by the user's skill profile, and a word containing that phoneme may be selected by the machine for inclusion in the generated custom text, which may then be presented to the user for practicing the pronunciation of that phoneme.

The machine may generate the custom text by selecting a reference document that contains a reference story and then modifying the reference story to incorporate the set of words determined (e.g., selected) based on the skill profile. The result is a modified reference document (e.g., a modified reference story) that includes the selected words. The machine may then cause the modified reference document to be presented to the user (e.g., via a display screen).

In some example embodiments, the machine supports a recursive or otherwise adaptive approach to generate custom text, and after presentation of first custom text generated by the machine, the machine captures audio data (e.g., via a microphone) resultant from the user reading the first custom text aloud. The machine may perform a linguistic analysis of the audio data to assess language skills of the user and accordingly update the skill profile of the user based on the linguistic analysis of the audio data. This updated skill profile may then form a basis for similarly generating more custom text, such as second custom text.

For preparing the learning machine (e.g., the generator module or other AI module) for use in generating custom text, a trainer machine (e.g., a server machine or other computing machine) is specially configured (e.g., by suitable hardware modules, software modules, or any suitable combination thereof) to train the learning machine, which may take the example form of a generator module or other suitable AI module configured to generate custom text. The trainer machine accesses a reference set of documents, and each document in the reference set may contain a respectively corresponding reference story. The trainer machine then trains the learning machine to generate custom text based on one or more inputted words. The learning machine may be trained based on the reference stories collectively contained in the reference set of documents.

When the training process is complete, the trained learning machine is configured to generate custom text (e.g., a customized, machine-written story or other document) based on one or more inputted words (e.g., an further based on one or more of the reference set of documents). The trainer machine then provides (e.g., via a network) the trained learning machine to a device of the user. The provided learning machine configures the user's device to generate custom text (e.g., as described above). For example, the generated custom text may include a set of words inputted into the trained learning machine after being determined to correspond to the user based on a set of language skills specified by a skill profile of the user. Additional features and details are described below.

FIG. 1 is a network diagram illustrating a network environment 100 suitable for generating custom text based on a skill profile, according to some example embodiments. The network environment 100 includes a trainer machine 110, a database 115, and one or more devices 130 and 150, all communicatively coupled to each other via a network 190. The trainer machine 110, with or without the database 115, may form all or part of a cloud 118 (e.g., a geographically distributed set of multiple machines configured to function as a single server), which may form all or part of a network-based system 105 (e.g., a cloud-based server system configured to provide one or more network-based services to the devices 130 and 150). The trainer machine 110, the database 115, and the devices 130 and 150 may each be implemented in a special-purpose (e.g., specialized) computer system, in whole or in part, as described below with respect to FIG. 11.

Also shown in FIG. 1 are users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is associated with the device 130 and may be a user of the device 130. For example, the device 130 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 132. Likewise, the user 152 is associated with the device 150 and may be a user of the device 150. As an example, the device 150 may be a desktop computer, a vehicle computer, a home media system (e.g., a home theater system or other home entertainment system), a tablet computer, a navigational device, a portable media device, a smart phone, or a wearable device (e.g., a smart watch, smart glasses, smart clothing, or smart jewelry) belonging to the user 152.

Any of the systems or machines (e.g., databases and devices) shown in FIG. 1 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 11, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured in any of various ways, for example, as a text file, a table, a spreadsheet, a relational database (e.g., an object-relational database), a triple store, a hierarchical data store, a document database, a graph database, key-value pairs, or any suitable combination thereof. Moreover, any two or more of the systems or machines illustrated in FIG. 1 may be combined into a single system or machine, and the functions described herein for any single system or machine may be subdivided among multiple systems or machines.

The network 190 may be any network that enables communication between or among systems, machines, databases, and devices (e.g., between the machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone service (POTS) network), a wireless data network (e.g., a WiFi network or WiMax network), or any suitable combination thereof. Any one or more portions of the network 190 may communicate information via a transmission medium.

As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
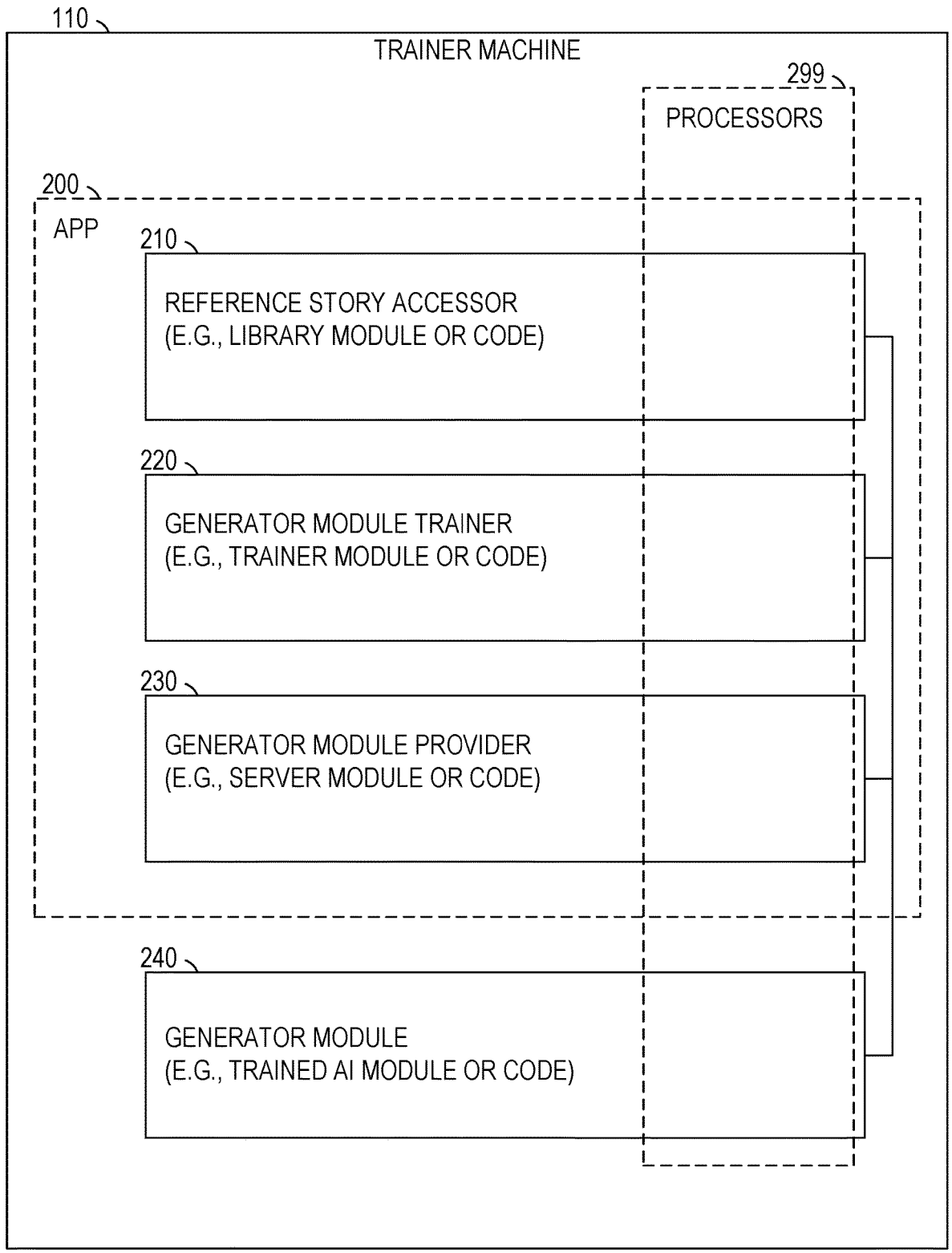
FIG. 2 is a block diagram illustrating components of a trainer machine, according to some example embodiments.

FIG. 2 is a block diagram illustrating components of the trainer machine 110, according to some example embodiments. The trainer machine 110 is shown as including a reference story accessor 210, a generator module trainer 220, and a generator module provider 230, along with a generator module 240, which may be a learning machine (e.g., an AI module) trained or otherwise prepared for use by the generator module trainer 220. The components of the trainer machine 110 may all be configured to communicate with each other (e.g., via a bus, shared memory, or a switch).

The reference story accessor 210 may be or include a library module or similarly suitable code for accessing a library of reference documents). The generator module trainer 220 may be or include a trainer module or similarly suitable code for training a learning machine (e.g., an AI module). The generator module provider 230 may be or include a server module or similarly suitable code for providing a trained learning machine (e.g., a trained AI module, such as the generator module 240).

As shown in FIG. 2, the reference story accessor 210, the generator module trainer 220, the generator module provider 230, or any suitable combination thereof may form all or part of an app 200 (e.g., a server app) that is stored (e.g., installed) on the trainer machine 110 (e.g., responsive to or otherwise as a result of data being received by the device 130 via the network 190). Furthermore, one or more processors 299 (e.g., hardware processors, digital processors, or any suitable combination thereof) may be included (e.g., temporarily or permanently) in the app 200, the reference story accessor 210, the generator module trainer 220, the generator module provider 230, the generator module 240, or any suitable combination thereof.

Figure 3:
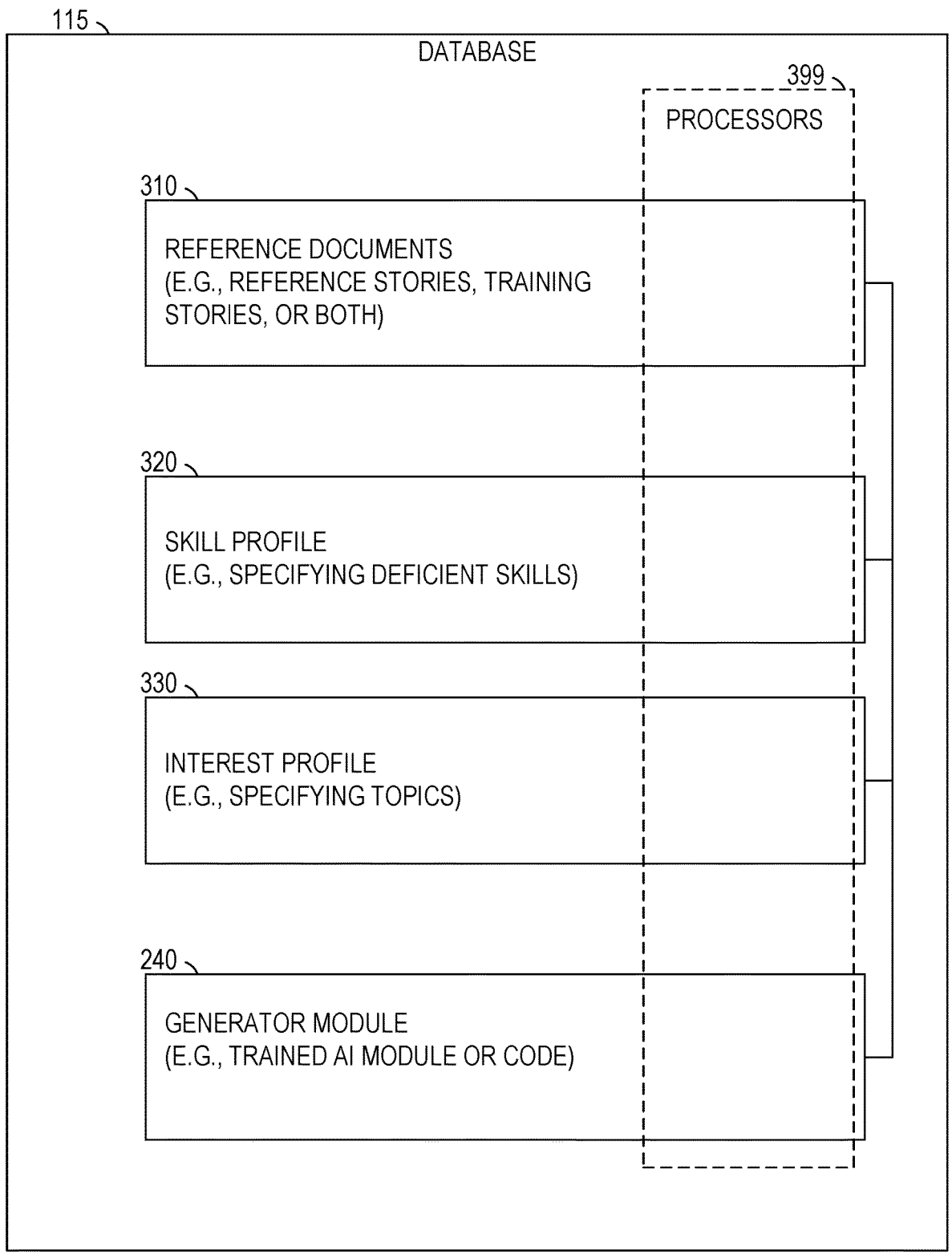
FIG. 3 is a block diagram illustrating components of a database, according to some example embodiments.

FIG. 3 is a block diagram illustrating components of the database 115, according to some example embodiments. The database 115 is shown as including reference documents 310 (e.g., reference stories for customization, for training a learning machine, or for both), a skill profile 320 (e.g., a language skill profile that specifies one or more language skills of the user 132), an interest profile 330 (e.g., specifying one or more topics of interest to the user 132), and the generator module 240 (e.g., an AI module trained by the trainer machine 110 and available for provision to one or more of the devices 130 and 150).

The skill profile 320 indicates or otherwise specifies one or more skills that correspond to the user 132 and may have been generated, updated, or otherwise prepared for being accessed (e.g., accessed by the user profile accessor 410). For example, the device 130 may have presented the user 132 with one or more programs (e.g., via a display screen). The programs may be or include educational programs, such as educational games, videos, problems to solve, vocabulary words, or the like. Although the discussion herein, for brevity and clarity, focuses on language skills (e.g., literacy skills) being specified in the skill profile 320, various example embodiments may include extension to math skills or other skills that can be improved by generating custom text with which the user 132 can practice such skills. Accordingly, the one or more programs may test the user 132 for proficiency or deficiency in one or more skills (e.g., language skills, math skills, or both), and based on the user's interaction with the one or more programs, the one or more programs may determine corresponding degrees to which such skills are present in (e.g., mastered by) the user 132. The skills specified in the skill profile 320 thus may indicate weaknesses of the user 132, strengths of the user 132, or any suitable combination thereof. For example, the skill profile may indicate language skills that the user 132 has not yet mastered.

As shown in FIG. 3, one or more processors 399 (e.g., hardware processors, digital processors, or any suitable combination thereof) may be included (e.g., temporarily or permanently) in the reference documents 310, the skill profile 320, the interest profile 330, the generator module 240, or any suitable combination thereof.

Figure 4:
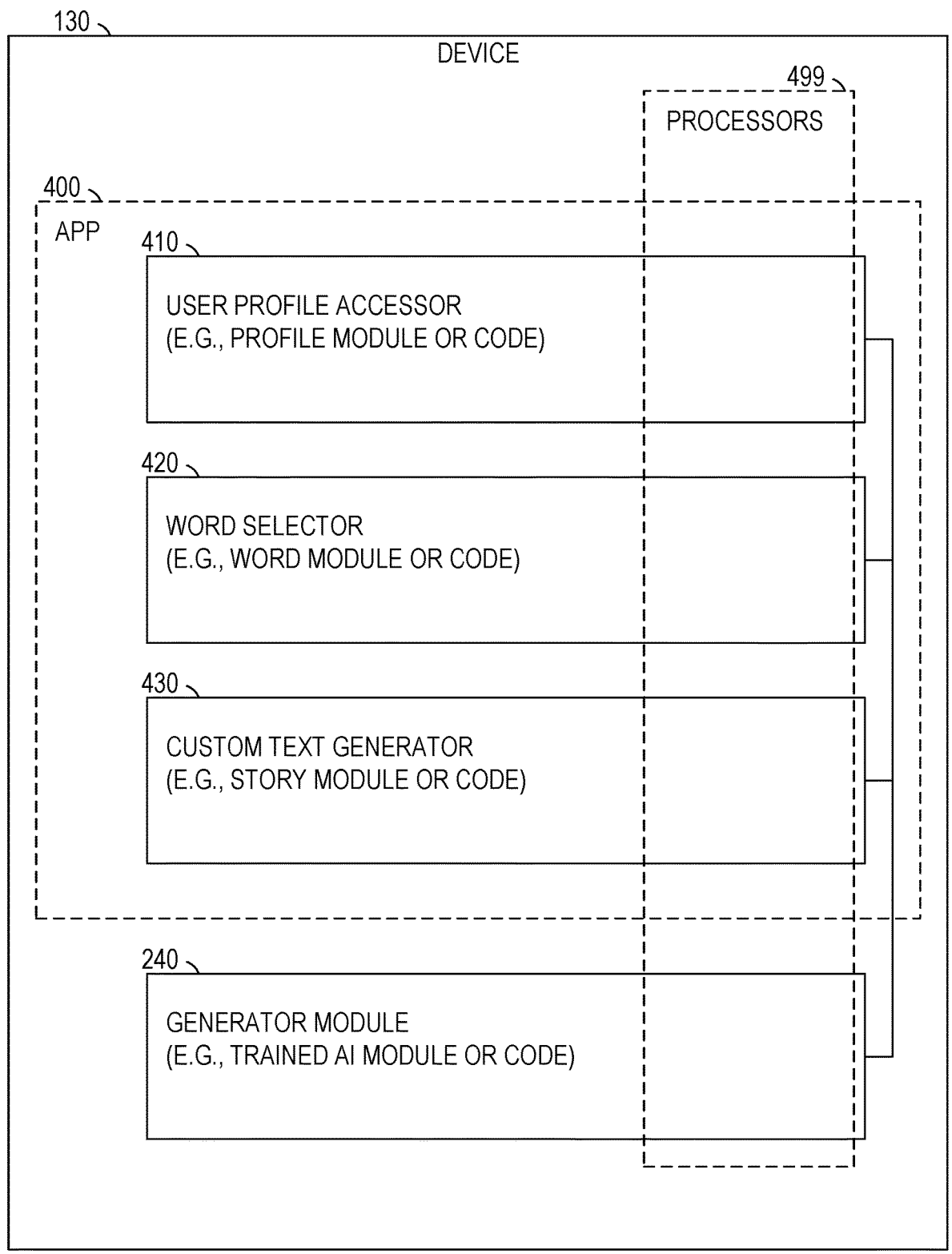
FIG. 4 is a block diagram illustrating components of a device, according to some example embodiments.

FIG. 4 is a block diagram illustrating components of the device 130, according to some example embodiments. The device 130 is shown as including a user profile accessor 410, a word selector 420, a custom text generator 430, and the generator module 240 (e.g., an AI module trained by the trainer machine 110 and provided to the device 130 via the network 190), all configured to communicate with each other (e.g., via a bus, shared memory, or a switch).

The user profile accessor 410 may be or include a profile module or similarly suitable code for accessing one or more user profiles (e.g., the skill profile 320, the interest profile 330, or both). The word selector 420 may be or include a word module or similarly suitable code for determining (e.g., by selection) a set of one or more words to be included in custom text to be generated for a user (e.g., the user 132), including determination of one or more words based on a skill profile of the user (e.g., the skill profile 320 of the user 132). The custom text generator 430 may be or include a story module or similarly suitable code for generating custom text (e.g., a custom story or other custom document that includes the one or more words determined by the word selector 420). Foe example, the custom text generator 430 may be configured to generate custom text by inputting the one or more words determined by the word selector 420 into the generator module 240, whose resulting output is or includes the generated custom text.

As shown in FIG. 4, the user profile accessor 410, the word selector 420, the custom text generator 430, or any suitable combination thereof may form all or part of an app 400 (e.g., a mobile app) that is stored (e.g., installed) on the device 130. Furthermore, one or more processors 499 (e.g., hardware processors, digital processors, or any suitable combination thereof) may be included (e.g., temporarily or permanently) in the app 400, the user profile accessor 410, the word selector 420, the custom text generator 430, the generator module 240, or any suitable combination thereof.

Any one or more of the components (e.g., modules) described herein may be implemented using hardware alone (e.g., one or more of the processors 299, 399, or 499) or a combination of hardware and software. For example, any component described herein may physically include an arrangement of one or more of the processors 299, 399, or 499 (e.g., a subset of or among the processors 299, 399, or 499) configured to perform the operations described herein for that component. As another example, any component described herein may include software, hardware, or both, that configure an arrangement of one or more of the processors 299, 399, or 499 to perform the operations described herein for that component. Accordingly, different components described herein may include and configure different arrangements of the processors 299, 399, or 499 at different points in time or a single arrangement of the processors 299, 399, or 499 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 5:
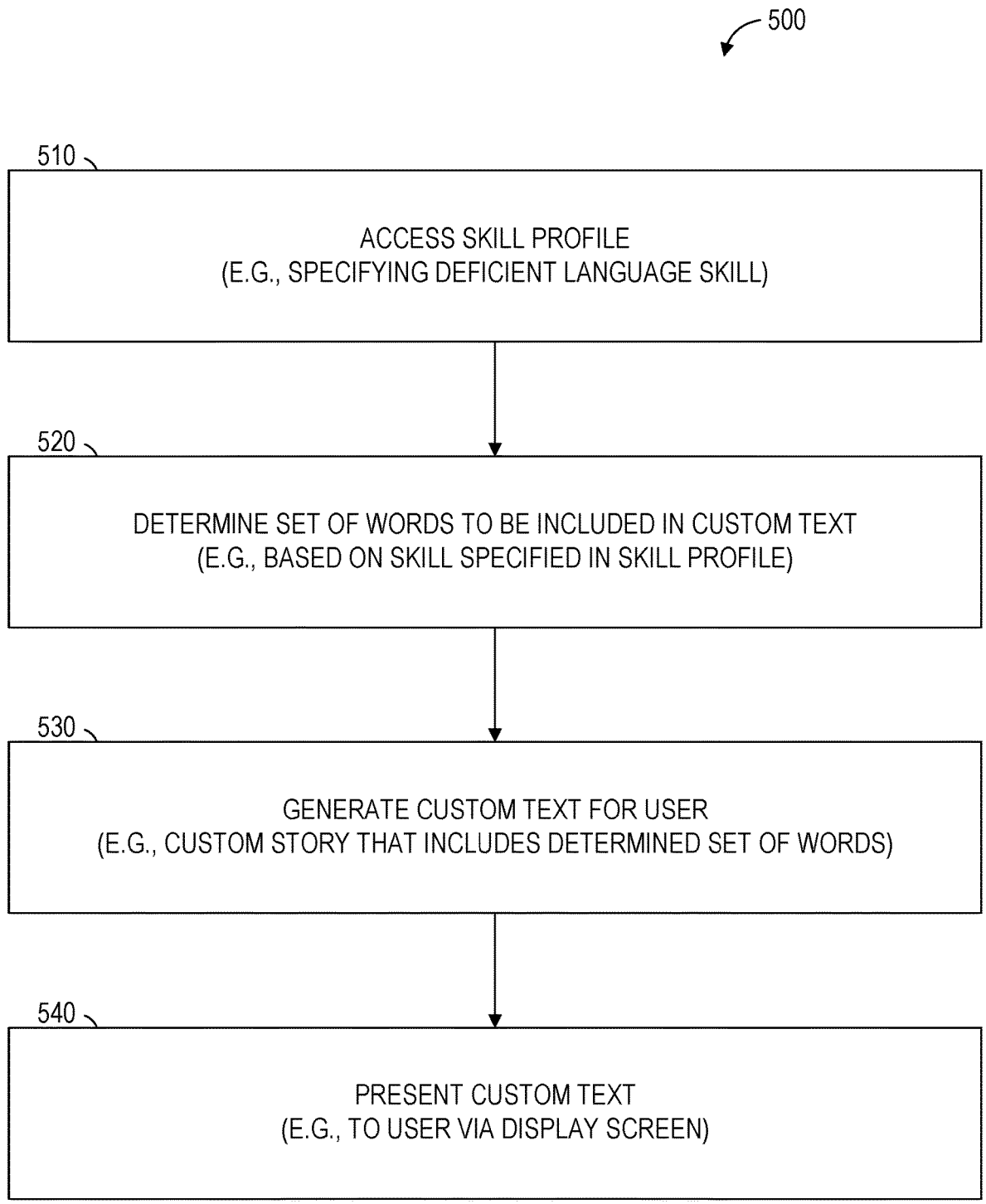
FIGS. 5-8 are flowcharts illustrating operations of the device in performing a method of generating custom text based on a skill profile, according to some example embodiments.

FIG. 5-8 are flowcharts illustrating operations of the device 130 in performing a method 500 of generating custom text based on the skill profile 320, according to some example embodiments. Operations in the method 500 may be performed by the device 130, using components (e.g., modules) described above with respect to FIG. 4, using one or more processors (e.g., microprocessors or other hardware processors), or using any suitable combination thereof. As shown in FIG. 5, the method 500 includes operations 510, 520, 530, and 540.

In the operation 510, the user profile accessor 410 accesses the skill profile 320 (e.g., from the database 115). As noted above, the skill profile 320 may be or include a language skill profile that specifies one or more language skills with respectively corresponding degrees of proficiency or deficiency for the user 132. The skill profile 320 may thus identify one or more language skills corresponding to the user 132.

In the operation 520, the word selector 420 determines (e.g. by selecting or updating) a set of words to be included in the custom text that will be generated in the upcoming operation 530. For example, the words may be selected based on (e.g., responsive to) their possession of one or more characteristics that correspond to one or more skills specified by the skill profile 320. For example, a characteristic of a word may be the presence or absence of one or more phonemes. As another example, a characteristic of a word may be an alphabetic letter or a combination of alphabetic letters (e.g., the "ing" suffix, the sequence "cei," or the sequence "ie" following any letter except "c").

Thus, a single word may have multiple sub-components (e.g., a letter, a sequence of letters, a phoneme, or any suitable combination thereof), and a sub-component of a word may correspond to a specific skill. Additionally, single skill may have multiple sub-skills. For example, the skill of pronouncing a word may include individual sub-skills for pronouncing individual sub-components of the word. Accordingly, the skill profile 320 may specify one or more sub-skills of skills, one or more whole skills, or any suitable combination thereof, and the word selector 420 may use a specified skill or sub-skill as a basis for selecting one or more words that contain a sub-component correlated to the specified skill or sub-skill. In some example embodiments, the word selector 420 includes information (e.g., a lookup table) that correlates skills to words, sub-skills of skills to words, sub-skills of skills to sub-components of words, skills to sub-components of words, or any suitable combination thereof. In certain example embodiments, the word selector 420 accesses such information from the database 115.

In the operation 530, the custom text generator 430 generates custom text for the user 132 (e.g., customized for the user 132 to practice one or more skills specified in the skill profile 320). The custom text may be generated by selecting and modifying a reference story (e.g., from the database 115, which may be storing various customizable stories). For example, the custom text may be generated by replacing words in the selected reference story with the set of words selected in the operation 520 based on the skill profile 320 of the user 132.

In some example embodiments, the custom text generator 430 generates the custom text without selection or modification of a reference story, such as by forming the selected words into machine-written sentences along with other words. Such machine-written sentence may then be assembled or otherwise combined by the custom text generator 430 to create the custom text in the form of a new story or other new document.

In the operation 540, the custom text generator 430 causes the custom text generated in the operation 530 to be presented (e.g., to the user 132). For example, the custom text generator 430 may display or cause display of the custom text by a display screen of the device 130 (e.g., for viewing by the user 132, for the user 132 to read aloud, or both).

Figure 6:
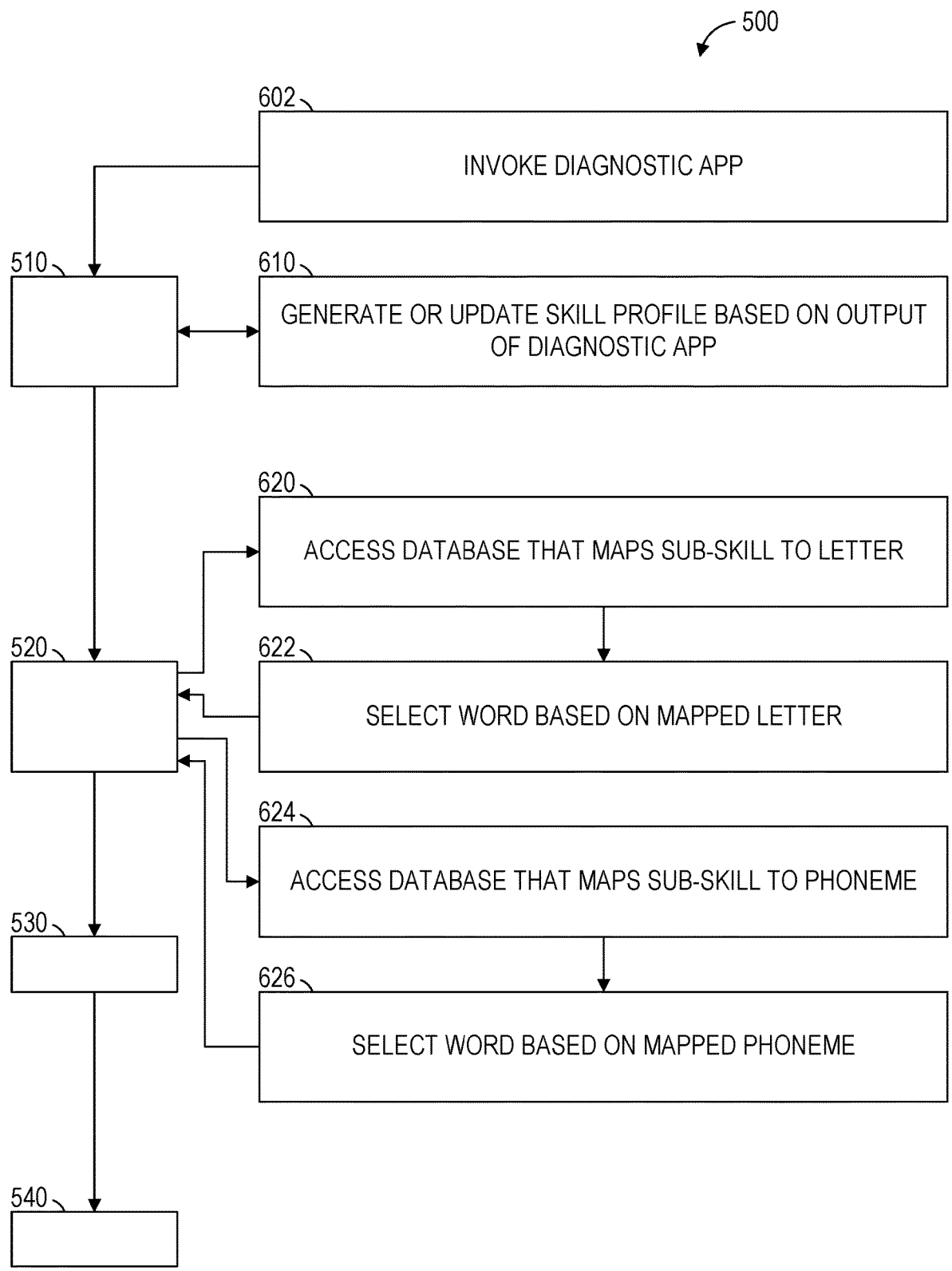

As shown in FIG. 6, in addition to any one or more of the operations previously described, the method 500 may include one or more of the operations 602, 610, 620, 622, 624, and 626. One or more of the operations 602 and 610 may be performed as part (e.g., a precursor task, a subroutine, or a portion) of the operation 510. One or more of the operations 620, 622, 624, and 626 may be performed as part (e.g., a precursor task, a subroutine, or a portion) of the operation 520.

In the operation 602, the user profile accessor 410 invokes, runs, or otherwise initiates execution of a diagnostic app (e.g., by the device 130 of the user 132). The user 132 may be able to interact with the diagnostic app, and such interaction with the diagnostic app may cause the diagnostic app to provide output to the user profile accessor 410. The output of the diagnostic app may be, include, or otherwise specify one or more words that are difficult for the user 132, easy for the user 132, or any suitable combination thereof. According to various example embodiments, the output indicates or otherwise specifies one or more words, one or more sub-components of words, one or more skills, one or more sub-skills of skills, or any suitable combination thereof, as deficiencies of the user 132, proficiencies of the user 132, or any suitable combination thereof. The output of the diagnostic app may accordingly be a basis for generating the skill profile 320 of the user 132.

In the operation 610, the user profile accessor 410 generates (e.g., creates or updates) the skill profile 320 of the user 132. The generation of the skill profile 320 may be based on the output of the operation 602 (e.g., some or all of the output of the diagnostic app). Based on such output, the user profile accessor 410 may determine a set of one or more skills in which the user 132 is deficient, proficient, or any suitable combination thereof. The user profile accessor 410, in generating the skill profile 320, may accordingly cause the skill profile 320 to specify the determined set of skills of the user 132. In some example embodiments, the user profile accessor 410 includes information (e.g., a lookup table) that correlates skills to words, sub-skills of skills to words, sub-skills of skills to sub-components of words, skills to sub-components of words, or any suitable combination thereof. In certain example embodiments, the user profile accessor 410 accesses such information from the database 115.

In the operation 620, the word selector 420 accesses the database 115, which correlates (e.g., maps or otherwise assigns) a sub-skill of a skill to a sub-component of a word. In example embodiments that include the operation 620, the sub-component is a letter contained in the word or a combination (e.g., a sequence or a string) of multiple letters (e.g., the suffix "ing") in the word. Thus, one or more words with the correlated sub-component (e.g., the letter or the combination of letters) may be selected by the word selector 420 in the performing of the operation 520.

In the operation 622, the word selector 420 selects a word for inclusion in the custom text to be generated in the operation 530. The selection of the word is based on a sub-skill of a skill specified in the skill profile 320. Specifically, the selection of the word is based on the sub-skill being correlated (e.g., mapped by the word selector 420 or the database 115) to the sub-component (e.g., the letter or string of letters) that is correlated to the word by the database 115 (e.g., as accessed in the operation 620).

In the operation 624, the word selector 420 accesses the database 115, which correlates a sub-skill of a skill to a sub-component of a word. In example embodiments that include the operation 624, the sub-component is a phoneme contained in the word. Thus, one or more words with the correlated sub-component (e.g., the phoneme) may be selected by the word selector 420 in the performing of the operation 520.

In the operation 626, the word selector 420 selects a word for inclusion in the custom text to be generated in the operation 530. The selection of the word is based on a sub-skill of a skill specified in the skill profile 320. Specifically, the selection of the word is based on the sub-skill being correlated (e.g., mapped by the word selector 420 or the database 115) to the sub-component (e.g., the phoneme) that is correlated to the word by the database 115 (e.g., as accessed in the operation 624).

Figure 7:
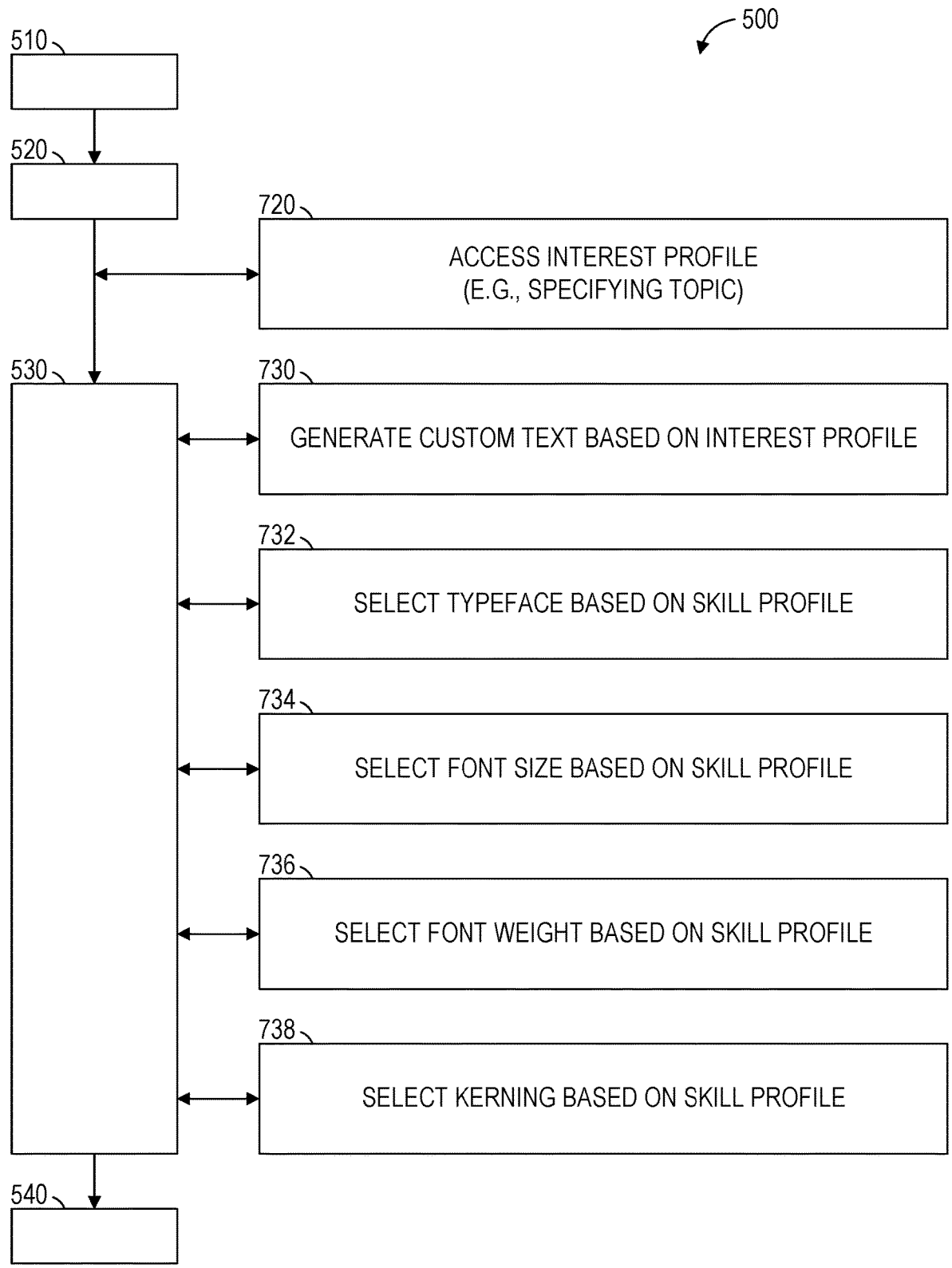

As shown in FIG. 7, in addition to any one or more of the operations previously described, the method 500 may include one or more of the operations 720, 730, 732, 734, 736, and 738. The operation 720 may be performed before the operation 530. One or more of the operations 730, 732, 734, 736, and 738 may be performed as part of the operation 530.

In the operation 720, the word selector 420 accesses the interest profile 330 of the user 132. For example, the interest profile 330 may be accessed from the database 115. In some example embodiments, the user 132 may specify one or more topics of interest in the interest profile 330 for use in generating the custom text in the operation 530, and the interest profile 330 may accordingly list the one or more topics specified by the user 132. Thus, in example embodiments that include the operation 720, the word selector 420 uses the accessed interest profile 330 and, when performing the operation 530, generates the custom text based on one or more topics listed or otherwise specified in the interest profile 330 of the user 132. This may have the effect of allowing the user 132 to select a specific topic of interest to learn about or study, while being provided with custom text that both discusses the specific topic and contains words specially selected for practicing skills or sub-skills in which the user 132 is deficient, proficient, or any suitable combination thereof.

In the operation 730, as part of generating the custom text with the words selected in the operation 520, the custom text generator 430 generates the custom text based on one or more topics specified by the interest profile 330 (e.g., as accessed in the operation 720). As noted above, the interest profile 330 may specify one or more topics of interest to the user 132. Accordingly, the custom text being generated in the operation 530 may discuss, incorporate, or otherwise be generated based on one or more of the topics specified in the interest profile 330. For example, the custom text generator 430 may select a reference document (e.g., containing a reference story) of a specified topic from among the reference documents 310 in the database 115, for modification (e.g., by replacement of original words with the words selected in the operation 520) to generate the custom text in the operation 530.

In the operation 732, as part of generating the custom text with the words selected in the operation 520, the custom text generator 430 selects a typeface based on the skill profile accessed in the operation 510. For example, the custom text generator 430 (e.g., by its own operation or by invoking the generator module 240) may select one typeface (e.g., one relatively easy to read) to use for words whose sub-components are correlated to skills or sub-skills in which the user 132 is deficient, as indicated by the skill profile 320 of the user 132. As another example, the custom text generator 430 may select another typeface (e.g., one relatively less easy to read) to use for words whose sub-components are not correlated to skills or sub-skills in which the user 132 is not deficient (e.g., skills or sub-skills mastered by the user 132), as indicated by the skill profile 320 of the user 132. In some example embodiments, the custom text generator 430 selects a typeface (e.g., one of average difficulty to read) to use for words whose sub-components are correlated to skills or sub-skills in which the user 132 is proficient, as indicated by the skill profile 320 of the user 132. The custom text generator 430 accordingly generates at least a portion of the custom text (e.g., a portion containing the words whose sub-components are correlated to the skills or sub-skills used in selecting the typeface) using the selected typeface.

In the operation 734, as part of generating the custom text with the words selected in the operation 520, the custom text generator 430 selects a font size based on the skill profile accessed in the operation 510. For example, the custom text generator 430 may select one font size (e.g., one relatively large or otherwise easy to read) to use for words whose sub-components are correlated to skills or sub-skills in which the user 132 is deficient, as indicated by the skill profile 320 of the user 132. As another example, the custom text generator 430 may select another font size (e.g., one relatively small or otherwise less easy to read) to use for words whose sub-components are not correlated to skills or sub-skills in which the user 132 is not deficient, as indicated by the skill profile 320 of the user 132. In some example embodiments, the custom text generator 430 selects a font size (e.g., one of average size or difficulty to read) to use for words whose sub-components are correlated to skills or sub-skills in which the user 132 is proficient, as indicated by the skill profile 320 of the user 132. The custom text generator 430 accordingly generates at least a portion of the custom text (e.g., a portion containing the words whose sub-components are correlated to the skills or sub-skills used in selecting the font size) using the selected font size.

In the operation 736, as part of generating the custom text with the words selected in the operation 520, the custom text generator 430 selects a font weight based on the skill profile accessed in the operation 510. For example, the custom text generator 430 may select one font weight (e.g., one relatively heavy or otherwise easy to read) to use for words whose sub-components are correlated to skills or sub-skills in which the user 132 is deficient, as indicated by the skill profile 320 of the user 132. As another example, the custom text generator 430 may select another font weight (e.g., one relatively light or otherwise less easy to read) to use for words whose sub-components are not correlated to skills or sub-skills in which the user 132 is not deficient, as indicated by the skill profile 320 of the user 132. In some example embodiments, the custom text generator 430 selects a font weight (e.g., one of average weight or difficulty to read) to use for words whose sub-components are correlated to skills or sub-skills in which the user 132 is proficient, as indicated by the skill profile 320 of the user 132. The custom text generator 430 accordingly generates at least a portion of the custom text (e.g., a portion containing the words whose sub-components are correlated to the skills or sub-skills used in selecting the font weight) using the selected font weight.

In the operation 738, as part of generating the custom text with the words selected in the operation 520, the custom text generator 430 selects a kerning based on the skill profile accessed in the operation 510. For example, the custom text generator 430 may select one kerning (e.g., one relatively widely spaced or otherwise easy to read) to use for words whose sub-components are correlated to skills or sub-skills in which the user 132 is deficient, as indicated by the skill profile 320 of the user 132. As another example, the custom text generator 430 may select another kerning (e.g., one relatively closely spaced or otherwise less easy to read) to use for words whose sub-components are not correlated to skills or sub-skills in which the user 132 is not deficient, as indicated by the skill profile 320 of the user 132. In some example embodiments, the custom text generator 430 selects a kerning (e.g., one of average spacing or difficulty to read) to use for words whose sub-components are correlated to skills or sub-skills in which the user 132 is proficient, as indicated by the skill profile 320 of the user 132. The custom text generator 430 accordingly generates at least a portion of the custom text (e.g., a portion containing the words whose sub-components are correlated to the skills or sub-skills used in selecting the kerning) using the selected kerning.

Figure 8:
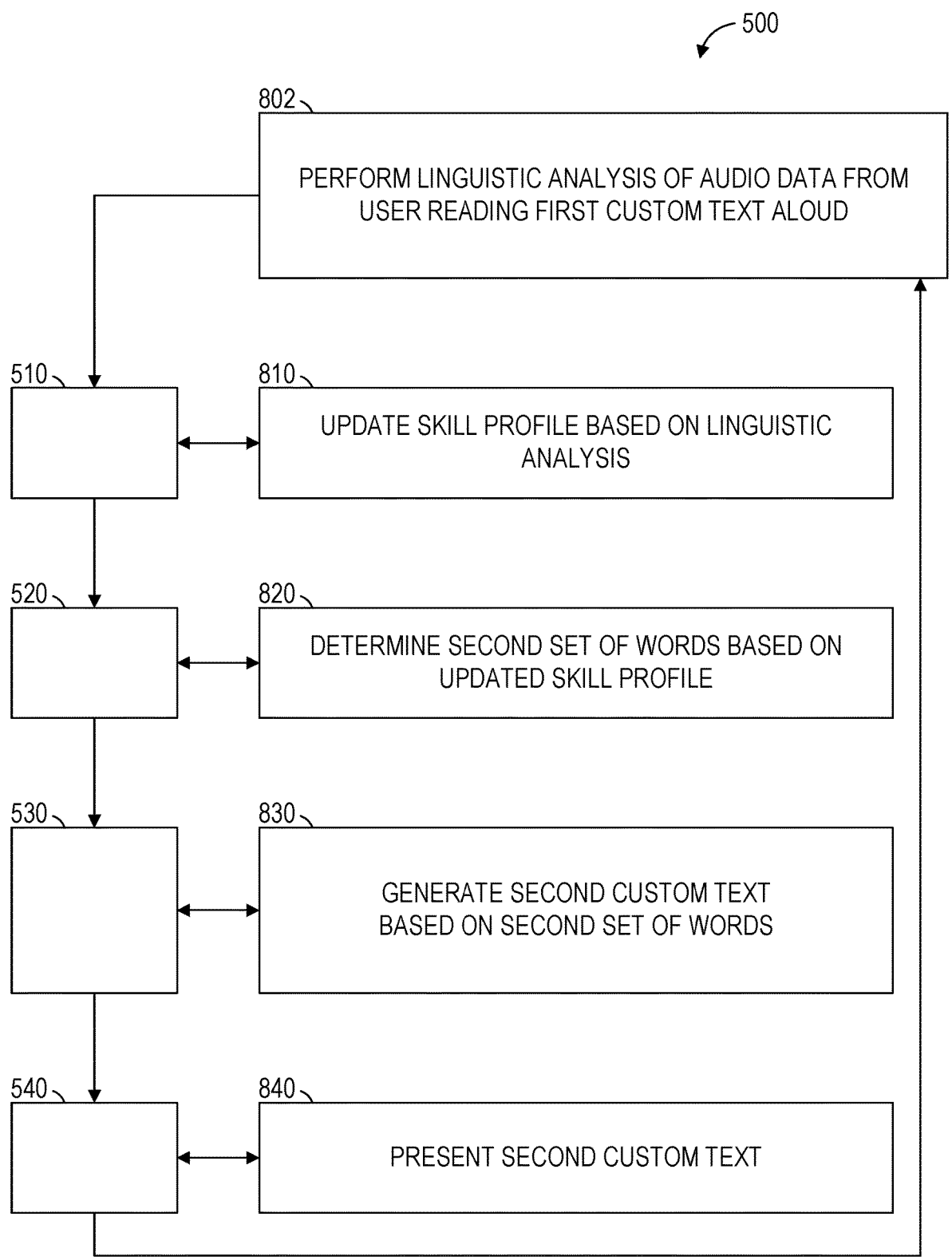

As shown in FIG. 8, in addition to any one or more of the operations previously described, the method 500 may include one or more of the operations 802, 810, 820, 830, and 840. One or more of the operations 802 and 810 may be performed as part of the operation 510. The operation 820 may be performed as part of the operation 520. The operation 830 may be performed as part of the operation 530. The operation 840 may be performed as part of the operation 540.

In the operation 802, the user profile accessor 410 performs a linguistic analysis of audio data. The audio data may be generated by (e.g., recorded by) the device 130 as a result of the user 132 reading aloud a first custom text that has been presented to the user 132 by the device 130. The linguistic analysis may detect one or more deficiencies, proficiencies, or any suitable combination thereof, in one or more language skills (e.g., pronunciation skills or sub-skills) by analyzing the voice of the user 132 as the user 132 reads the first custom text aloud. Accordingly, output from the performed linguistic analysis may form a basis for updating the skill profile 320 of the user 132.

In the operation 810, the user profile accessor 410 updates the skill profile 320 of the user 132 based on the linguistic analysis (e.g., some or all of the output thereof) performed in the operation 802. For example, the skill profile 320 may be updated to include a skill corresponding to a detected deficiency or proficiency in the ability of the user 132 to pronounce a word or a sub-component of a word.

In the operation 820, the word selector 420 determines (e.g., selects) a set of words to be included in the custom text that will be generated in the upcoming operation 530. This operation 820 may be performed in a manner similar to that described above for the operation 520. In example embodiments that include the operation 820, the word selector 420 previously determined a first set of words (e.g., in performing an earlier instance of the operation 520), and now in the operation 820 (e.g., a second instance of the operation 520), the word selector 420 is determining a second set of words. The second set of words may be determined based on the updated skill profile 320 of the user 132 (e.g., as updated in the operation 810).

In the operation 830, the custom text generator 430 generates custom text for the user 132. This operation 830 may be performed in a manner similar to that described above for the operation 530. In example embodiments that include the operation 830, the custom text generator 430 previously generated first custom text (e.g., in performing an earlier instance of the operation 530), and now in the operation 830 (e.g., a second instance of the operation 530), the custom text generator 430 is generating second custom text. The second custom text may be generated based on the second set of words (e.g., as determined in the operation 820).

In the operation 840, the custom text generator 430 causes the second custom text generated in the operation 830 to be presented (e.g., to the user 132). For example, the custom text generator 430 may display or cause display of the second custom text by a display screen of the device 130 (e.g., for viewing by the user 132, for the user 132 to read aloud, or both).

Figure 9:
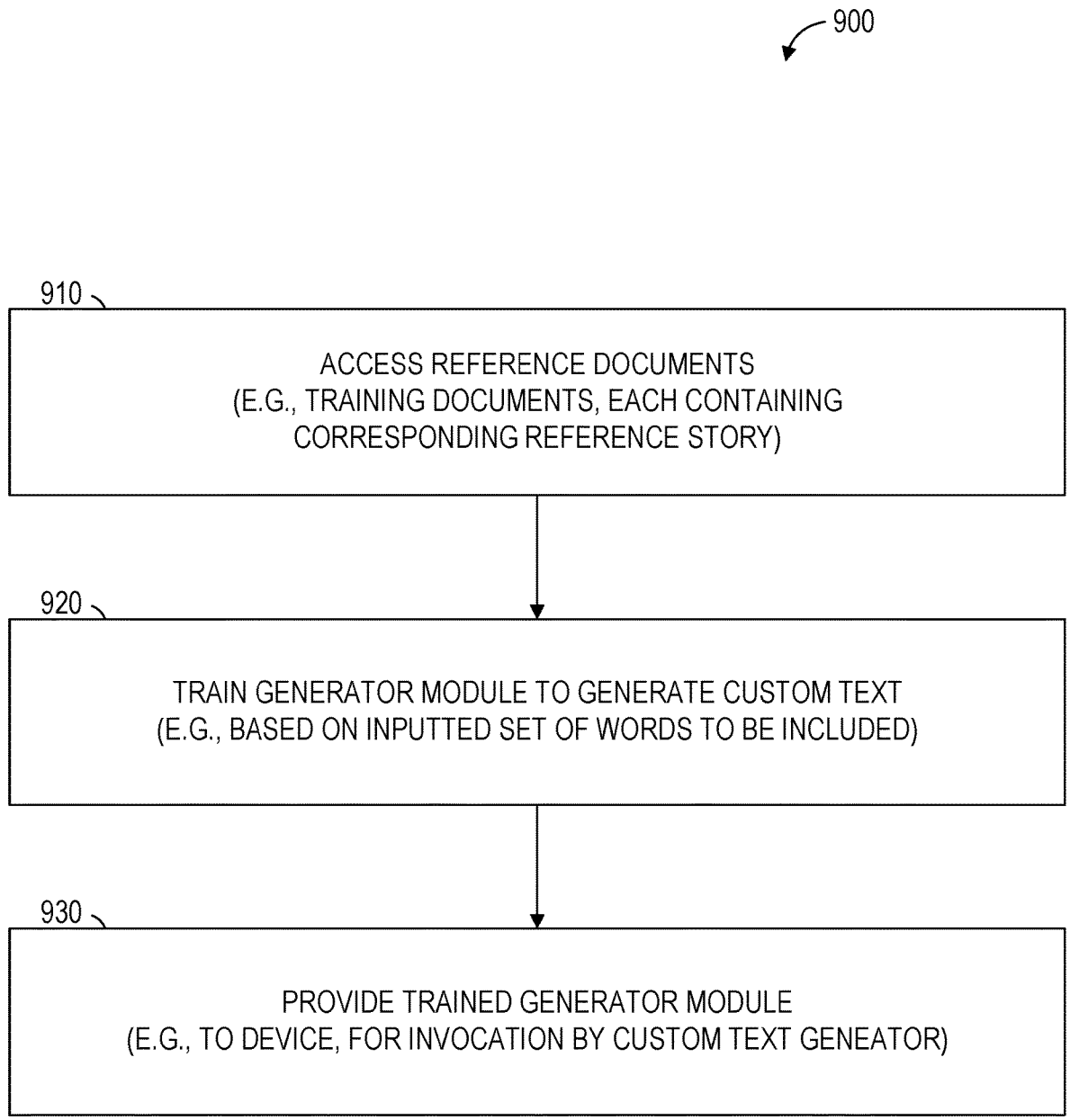
FIGS. 9 and 10 are flowcharts illustrating operations of the trainer machine in performing a method of training a learning machine in the example form of a generator module (e.g., an artificial intelligence (AI) module) to generate custom text based on a skill profile, according to some example embodiments.
Figure 10:
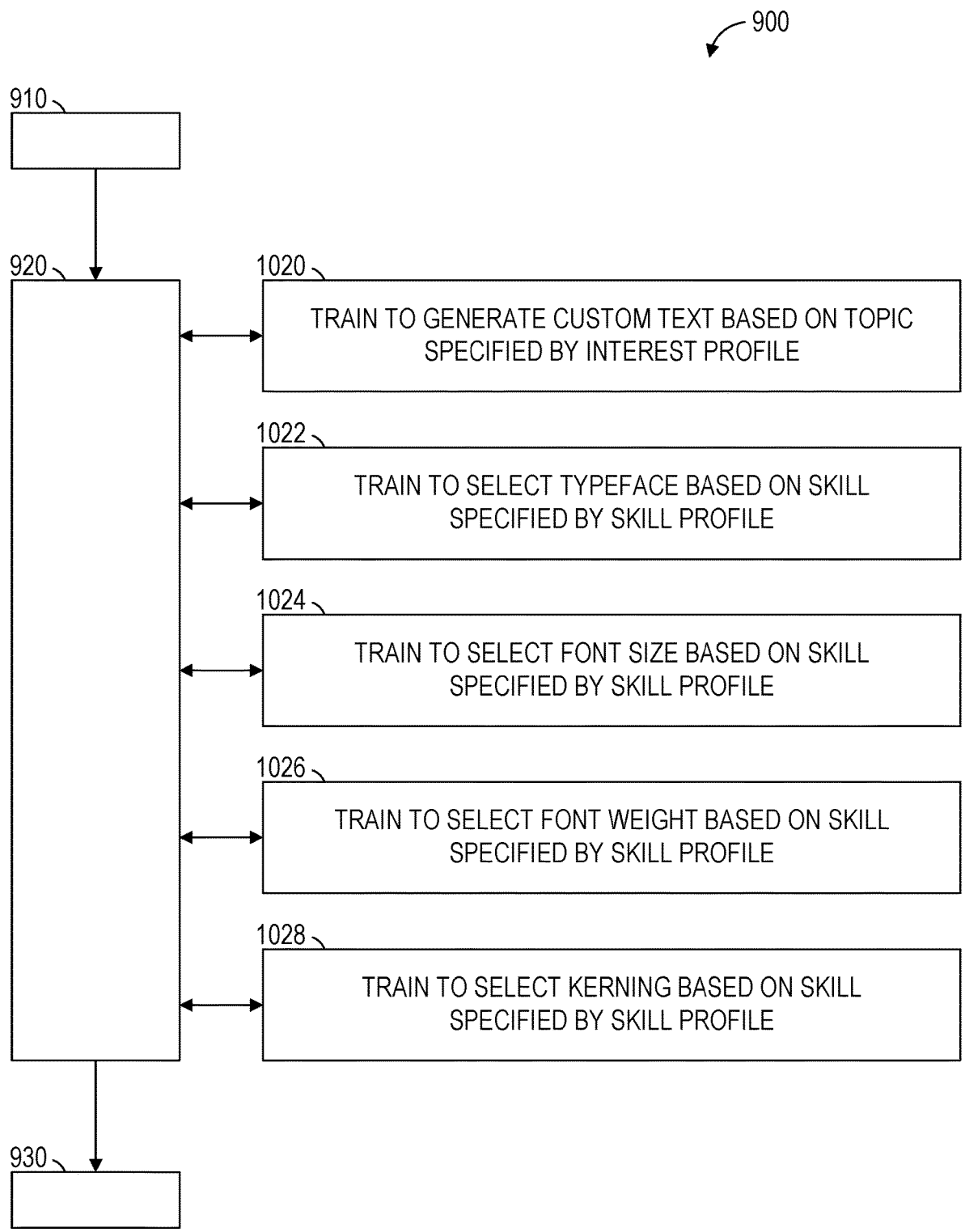

FIGS. 9 and 10 are flowcharts illustrating operations of the trainer machine 110 in performing a method 900 of training a learning machine in the example form of the generator module 240 (e.g., an AI module) to generate custom text based on a skill profile (e.g., the skill profile 320), according to some example embodiments. Operations in the method 900 may be performed by the trainer machine 110, using components (e.g., modules) described above with respect to FIG. 2, using one or more processors (e.g., microprocessors or other hardware processors), or using any suitable combination thereof. As shown in FIG. 9, the method 900 includes operations 910, 920, and 930.

In the operation 910, the reference story accessor 210 accesses the reference documents 310 (e.g., from the database 115). Each of the reference documents 310 may contain a respectively corresponding reference story. Accordingly, some or all of the reference documents 310 may be used as a library of training data for training the generator module 240 (e.g., using one or more machine-learning techniques).

In the operation 920, the generator module trainer 220 trains the generator module 240 based on some or all of the reference documents 310 accessed in the operation 910. Specifically, the generator module trainer 220 trains (e.g., via one or more machine-learning techniques) the generator module 240 to generate custom text based on one or more inputted words (e.g., additionally based on some or all of the reference documents 310). The training of the generator module 240 may accordingly be based on one or more reference stories contained in some or all of the accessed reference documents 310. As a result of this training process, the generator module 240 becomes configured to generate custom text based on input that includes a set of one or more words (e.g., to be determined and inputted into the generator module 240, as described above with respect to the operations 520 and 530 in the method 500).

In the operation 930, the generator module provider 230 provides the trained generator module 240 for use (e.g., by one or more of the devices 130 and 150). Specifically, the generator module provider 230 communicates or otherwise provides the trained generator module 240 to the device 130 of the user 132. The provision of the trained generator module 240 (e.g., along with the app 400) may fully or partly configure the device 130 to generate custom text that includes an inputted set of words determined to correspond to the user 132 based on a set of skills specified by a skill profile (e.g., the skill profile 320) of the user 132.

As shown in FIG. 10, in addition to any one or more of the operations previously described, the method 900 may include one or more of the operations 1020, 1022, 1024, 1026, and 1028. One or more of the operations 1020, 1022, 1024, 1026, and 1028 may be performed as part of the operation 920.

In the operation 1020, the generator module trainer 220 trains the generator module 240 to generate custom text based further on an interest profile (e.g., the interest profile 330 of the user 132). As noted above, a user (e.g., the user 132) may specify one or more topics of interest in a corresponding interest profile (e.g., the interest profile 330) for use in generating custom text, and the interest profile may accordingly list the one or more topics specified by the user. Thus, in example embodiments that include the operation 1020, the generator module trainer 220 trains the generator module 240 to generate custom text based on one or more topics listed or otherwise specified in the interest profile of the user (e.g., as accessed before or during generation of the custom text). The generated custom text accordingly may discuss the one or more topics, be generated by selecting and modifying a reference document about the one or more topics, or any suitable combination thereof.

In the operation 1022, the generator module trainer 220 trains the generator module 240 to generate custom text based further on a typeface selected or otherwise specified for at least a portion of the custom text. As noted above, the trained generator module 240 (e.g., as invoked by the custom text generator 430) may select one typeface (e.g., one relatively easy to read) to use for words whose sub-components are correlated to skills or sub-skills in which a user (e.g., the user 132) is deficient, as indicated by a skill profile (e.g., the skill profile 320) of that user. As another example, the trained generator module 240 may select another typeface (e.g., one relatively less easy to read) to use for words whose sub-components are not correlated to skills or sub-skills in which the user is not deficient (e.g., skills or sub-skills mastered by the user 132), as indicated by the skill profile of that user. In some example embodiments, the trained generator module 240 selects a typeface (e.g., one of average difficulty to read) to use for words whose sub-components are correlated to skills or sub-skills in which the user is proficient, as indicated by the skill profile of that user. The trained generator module 240 (e.g., as invoked by the custom text generator 430) accordingly generates at least a portion of the custom text (e.g., a portion containing the words whose sub-components are correlated to the skills or sub-skills used in selecting the typeface) using the selected typeface.

In the operation 1024, the generator module trainer 220 trains the generator module 240 to generate custom text based further on a font size selected or otherwise specified for at least a portion of the custom text. As noted above, the trained generator module 240 (e.g., as invoked by the custom text generator 430 may select one font size (e.g., one relatively large or otherwise easy to read) to use for words whose sub-components are correlated to skills or sub-skills in which a user (e.g., the user 132) is deficient, as indicated by a skill profile (e.g., the skill profile 320) of that user. As another example, the trained generator module 240 may select another font size (e.g., one relatively small or otherwise less easy to read) to use for words whose sub-components are not correlated to skills or sub-skills in which the user is not deficient, as indicated by the skill profile of that user. In some example embodiments, the trained generator module 240 selects a font size (e.g., one of average size or difficulty to read) to use for words whose sub-components are correlated to skills or sub-skills in which the user is proficient, as indicated by the skill profile of that user. The trained generator module 240 (e.g., as invoked by the custom text generator 430) accordingly generates at least a portion of the custom text (e.g., a portion containing the words whose sub-components are correlated to the skills or sub-skills used in selecting the font size) using the selected font size.

In the operation 1026, the generator module trainer 220 trains the generator module 240 to generate custom text based further on a font weight selected or otherwise specified for at least a portion of the custom text. As noted above, the trained generator module 240 (e.g., as invoked by the custom text generator 430) may select one font weight (e.g., one relatively heavy or otherwise easy to read) to use for words whose sub-components are correlated to skills or sub-skills in which a user (e.g., the user 132) is deficient, as indicated by a skill profile (e.g., the skill profile 320) of that user. As another example, the trained generator module 240 may select another font weight (e.g., one relatively light or otherwise less easy to read) to use for words whose sub-components are not correlated to skills or sub-skills in which the user is not deficient, as indicated by the skill profile of that user. In some example embodiments, the trained generator module 240 selects a font weight (e.g., one of average weight or difficulty to read) to use for words whose sub-components are correlated to skills or sub-skills in which the user is proficient, as indicated by the skill profile of that user. The trained generator module 240 (e.g., as invoked by the custom text generator 430) accordingly generates at least a portion of the custom text (e.g., a portion containing the words whose sub-components are correlated to the skills or sub-skills used in selecting the font weight) using the selected font weight.

In the operation 1028, the generator module trainer 220 trains the generator module 240 to generate custom text based further on a kerning selected or otherwise specified for at least a portion of the custom text. As noted above, the trained generator module 240 (e.g., as invoked by the custom text generator 430) may select one kerning (e.g., one relatively widely spaced or otherwise easy to read) to use for words whose sub-components are correlated to skills or sub-skills in which a user (e.g., the user 132) is deficient, as indicated by a skill profile (e.g., the skill profile 320) of that user. As another example, the trained generator module 240 may select another kerning (e.g., one relatively closely spaced or otherwise less easy to read) to use for words whose sub-components are not correlated to skills or sub-skills in which the user is not deficient, as indicated by the skill profile of that user. In some example embodiments, the trained generator module 240 selects a kerning (e.g., one of average spacing or difficulty to read) to use for words whose sub-components are correlated to skills or sub-skills in which the user is proficient, as indicated by the skill profile of that user. The trained generator module 240 (e.g., as invoked by the custom text generator 430) accordingly generates at least a portion of the custom text (e.g., a portion containing the words whose sub-components are correlated to the skills or sub-skills used in selecting the kerning) using the selected kerning.

According to various example embodiments, one or more of the methodologies described herein may facilitate generation of custom text based on a skill profile. Moreover, one or more of the methodologies described herein may facilitate generation and provision of custom text that contains words selected specially for practicing and building skills of a user. Hence, one or more of the methodologies described herein may facilitate automation of personalized user training or other personalized user education with respect to skills, such as language skills, compared to capabilities of pre-existing systems and methods.

When these effects are considered in aggregate, one or more of the methodologies described herein may obviate a need for certain efforts or resources that otherwise would be involved in custom text generation, automation of personalized user training, or both. Efforts expended by a user in accessing such custom text or in participating in such automated personal training, as well as efforts expended by an educator (e.g., a language skills teacher) in providing such custom text or such automated personal training, may be reduced by use of (e.g., reliance upon) a special-purpose machine that implements one or more of the methodologies described herein. Computing resources used by one or more systems or machines (e.g., within the network environment 100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 11:
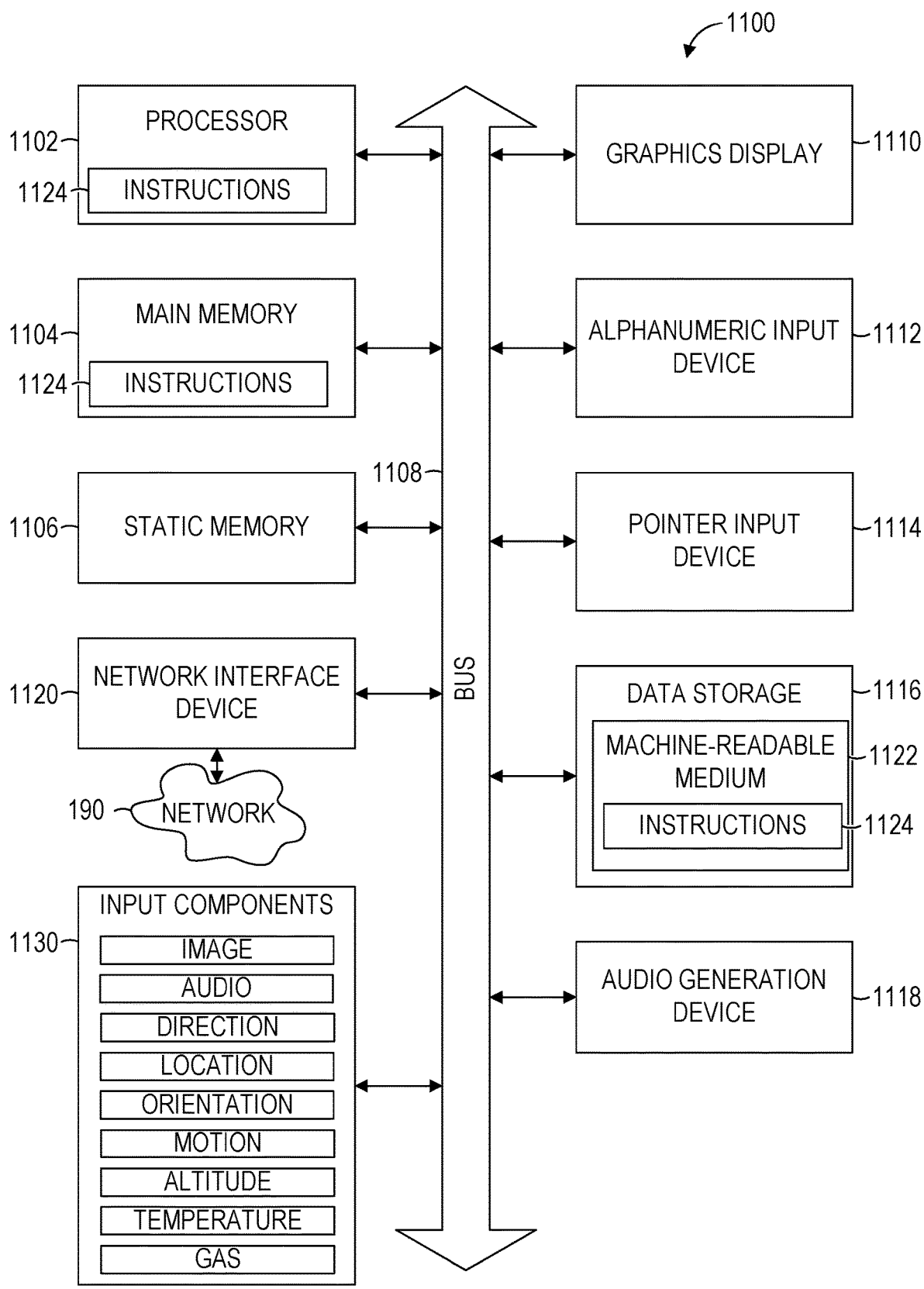
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read the instructions 1124 from a machine-readable medium 1122 (e.g., a non-transitory machine-readable medium, a machine-readable storage medium, a computer-readable storage medium, or any suitable combination thereof) and perform any one or more of the methodologies discussed herein, in whole or in part. Specifically, FIG. 11 shows the machine 1100 in the example form of a computer system (e.g., a computer) within which the instructions 1124 (e.g., software, a program, an application, an applet, an app, or other executable code) for causing the machine 1100 to perform any one or more of the methodologies discussed herein may be executed, in whole or in part.

In alternative example embodiments, the machine 1100 operates as a standalone device or may be communicatively coupled (e.g., networked) to other machines. In a networked deployment, the machine 1100 may operate in the capacity of a server machine or a client machine in a server-client network environment, or as a peer machine in a distributed (e.g., peer-to-peer) network environment. The machine 1100 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include any collection of machines that individually or jointly execute the instructions 1124 to perform all or part of any one or more of the methodologies discussed herein.

The machine 1100 includes a processor 1102 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 1104, and a static memory 1106, which are configured to communicate with each other via a bus 1108. The processor 1102 contains solid-state digital microcircuits (e.g., electronic, optical, or both) that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein. In some example embodiments, the processor 1102 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 1100 with at least the processor 1102, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 1100 may further include a graphics display 1110 (e.g., a plasma display panel (PDP), a light emitting diode (LED) display, a liquid crystal display (LCD), a projector, a cathode ray tube (CRT), or any other display capable of displaying graphics or video). The machine 1100 may also include an alphanumeric input device 1112 (e.g., a keyboard or keypad), a pointer input device 1114 (e.g., a mouse, a touchpad, a touchscreen, a trackball, a joystick, a stylus, a motion sensor, an eye tracking device, a data glove, or other pointing instrument), a data storage 1116, an audio generation device 1118 (e.g., a sound card, an amplifier, a speaker, a headphone jack, or any suitable combination thereof), and a network interface device 1120.

The data storage 1116 (e.g., a data storage device) includes the machine-readable medium 1122 (e.g., a tangible and non-transitory machine-readable storage medium) on which are stored the instructions 1124 embodying any one or more of the methodologies or functions described herein. The instructions 1124 may also reside, completely or at least partially, within the main memory 1104, within the static memory 1106, within the processor 1102 (e.g., within the processor's cache memory), or any suitable combination thereof, before or during execution thereof by the machine 1100. Accordingly, the main memory 1104, the static memory 1106, and the processor 1102 may be considered machine-readable media (e.g., tangible and non-transitory machine-readable media). The instructions 1124 may be transmitted or received over the network 190 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device (e.g., a smart phone, a tablet computer, or a wearable device) and may have one or more additional input components 1130 (e.g., sensors or gauges). Examples of such input components 1130 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components 1130 may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 1124 for execution by the machine 1100, such that the instructions 1124, when executed by one or more processors of the machine 1100 (e.g., processor 1102), cause the machine 1100 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 1124 for execution by the machine 1100 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 1124).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing suggests that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated descriptions describe various examples of methods, machine-readable media, and systems (e.g., machines, devices, or other apparatus) discussed herein. Any one or more features of an example, taken in isolation or combination, should be considered as being within the disclosure of this application.

A first example provides a method comprising:
  accessing, by one or more processors, a skill profile of a user, the skill profile specifying a set of language skills that correspond to the user;
  determining, by the one or more processors, a set of words that correspond to the user based on the set of language skills specified by the skill profile of the user;
  generating, by the one or more processors, custom text that includes the determined set of words by inputting the determined set of words into a learning machine trained based on a reference set of documents to generate custom text based on one or more inputted words; and
  presenting, by the one or more processors, the generated custom text that includes the set of words determined based on the set of language skills specified by the skill profile of the user.

A second example provides a method according to the first example, wherein:
  the set of language skills specified by the skill profile of the user includes a language skill in which the user is deficient;
  the determining of the set of words that correspond to the user includes selecting a word for inclusion in the set of words that correspond to the user based on the language skill in which the user is deficient; and
  the generated custom text includes the selected word.

A third example provides a method according to the first example or the second example, wherein:
  the set of language skills specified by the skill profile of the user includes a language skill that includes a language sub-skill; and
  the determining of the set of words that correspond to the user includes:
  accessing a database that correlates the language sub-skill with an alphabetic letter; and
  selecting a word for inclusion in the set of words that correspond to the user based on the word including the alphabetic letter that is correlated with the language sub-skill by the database.

A fourth example provides a method according to any of the first through third examples, wherein:
  the set of language skills specified by the skill profile of the user includes a language skill that includes a language sub-skill; and
  the determining of the set of words that correspond to the user includes:
  accessing a database that correlates the language sub-skill with a phoneme; and
  selecting a word for inclusion in the set of words that correspond to the user based on the word including the phoneme that is assigned with the language sub-skill by the database.

A fifth example provides a method according to any of the first through fourth examples, wherein:
  providing a language diagnostic application to a device of the user; and wherein:
  the accessing of the skill profile of the user includes generating the skill profile of the user based on output of the provided language diagnostic application.

A sixth example provides a method according to any of the first through fifth examples, wherein:
  accessing an interest profile of the user, the interest profile specifying a topic that corresponds to the user; and wherein:
  the generating of the custom text includes inputting the topic specified by the interest profile into the trained learning machine; and
  the generated custom text includes at least a portion generated by the trained learning machine based on the topic specified by the interest profile of the user.

A seventh example provides a method according to any of the first through sixth examples, wherein:
  the generating of the custom text includes selecting a typeface based on the set of language skills specified by the skill profile of the user; and
  the generated custom text includes a portion that has the typeface selected based on the set of language skills specified by the skill profile.

An eighth example provides a method according to any of the first through seventh examples, wherein:
  the generating of the custom text includes selecting a font size based on the set of language skills specified by the skill profile of the user; and
  the generated custom text includes a portion that has the font size selected based on the set of language skills specified by the skill profile.

A ninth example provides a method according to any of the first through eighth examples, wherein:
  the generating of the custom text includes selecting a font weight based on the set of language skills specified by the skill profile of the user; and
  the generated custom text includes a portion that has the font weight selected based on the set of language skills specified by the skill profile.

A tenth example provides a method according to any of the first through ninth examples, wherein:
  the generating of the custom text includes selecting a kerning based on the set of language skills specified by the skill profile of the user; and
  the generated custom text includes a portion that has the kerning selected based on the set of language skills specified by the skill profile.

An eleventh example provides a method according to any of the first through tenth examples, wherein:
  the generated custom text includes a second document generated subsequent to a first document previously generated; and the method further comprises:
  performing a linguistic analysis of audio data generated from the user reading aloud the first generated document; and wherein:
  the accessing of the skill profile of the user includes updating the skill profile of the user based on the linguistic analysis of the audio data generated from the user reading aloud the first generated document; and
  the generated second document is generated by the trained learning machine based on the skill profile updated based on the linguistic analysis.

A twelfth example provides a method according to the eleventh example, wherein:
  the determining of the set of words that correspond to the user includes determining a second set of words by updating a first set of words previously determined, the updating of the first set of words being based on the updated skill profile of the user; and
  the generated second document is generated by the trained learning machine based on the second set of words determined by the updating of the first set of words.

A thirteenth example provides a method according to the twelfth example, wherein:
  the generating of the custom text includes inputting the second set of words into the trained learning machine; and
  the generated custom text includes the second set of words determined by the updating of the first set of words based on the updated skill profile of the user.

A fourteenth example provides a method comprising:
  accessing, by one or more processors, a reference set of documents, each document in the reference set containing a corresponding reference story;
  training, by the one or more processors, a learning machine to generate custom text based on one or more inputted words, the training of the learning machine being based on reference stories contained in the reference set of documents, the trained learning machine being configured to generate custom text based on one or more inputted words; and
  providing, by the one or more processors, the trained learning machine to a device of the user, the provided trained learning machine configuring the device to generate custom text that includes an inputted set of words determined to correspond to the user based on a set of language skills specified by a skill profile of the user.

A fifteenth example provides a method according to the fourteenth example, wherein:
  the training of the learning machine includes training the learning machine to generate custom text based on a topic specified in an interest profile of the user.

A sixteenth example provides a method according to the fourteenth example or the fifteenth example, wherein:
  the training of the learning machine includes training the learning machine to generate custom text with a portion that has a typeface selected based on the set of language skills specified by the skill profile.

A seventeenth example provides a method according to any of the fourteenth through sixteenth examples, wherein:
  the training of the machine includes training the machine to generate the custom text with a portion that has kerning selected based on the set of language skills specified by the skill profile.

An eighteenth example provides a machine-readable medium (e.g., a non-transitory machine-readable storage medium) comprising instructions that, when executed by one or more processors of a machine, cause the machine to perform operations comprising:
  accessing a skill profile of a user, the skill profile specifying a set of language skills that correspond to the user;
  determining a set of words that correspond to the user based on the set of language skills specified by the skill profile of the user;
  generating custom text that includes the determined set of words by inputting the determined set of words into a learning machine trained based on a reference set of documents to generate custom text based on one or more inputted words; and presenting the generated custom text that includes the set of words determined based on the set of language skills specified by the skill profile of the user.

A nineteenth example provides a machine-readable medium (e.g., a non-transitory machine-readable storage medium) comprising instructions that, when executed by one or more processors of a machine, cause the machine to perform operations comprising:

accessing a reference set of documents, each document in the reference set containing a corresponding reference story;

training a learning machine to generate custom text based on one or more inputted words, the training of the learning machine being based on reference stories contained in the reference set of documents, the trained learning machine being configured to generate custom text based on one or more inputted words; and providing the trained learning machine to a device of the user, the provided trained learning machine configuring the device to generate custom text that includes an inputted set of words determined to correspond to the user based on a set of language skills specified by a skill profile of the user.

A twentieth example provides a system comprising:
one or more processors; and
a memory storing instructions that, when executed by at least one processor among the one or more processors, cause the system to perform operations comprising:
accessing a skill profile of a user, the skill profile specifying a set of language skills that correspond to the user;
determining a set of words that correspond to the user based on the set of language skills specified by the skill profile of the user;
generating custom text that includes the determined set of words by inputting the determined set of words into a learning machine trained based on a reference set of documents to generate custom text based on one or more inputted words; and
presenting the generated custom text that includes the set of words determined based on the set of language skills specified by the skill profile of the user.

A twenty-first example provides a system comprising:
one or more processors; and
a memory storing instructions that, when executed by at least one processor among the one or more processors, cause the system to perform operations comprising:
accessing a reference set of documents, each document in the reference set containing a corresponding reference story;
training a learning machine to generate custom text based on one or more inputted words, the training of the learning machine being based on reference stories contained in the reference set of documents, the trained learning machine being configured to generate custom text based on one or more inputted words; and
providing the trained learning machine to a device of the user, the provided trained learning machine configuring the device to generate custom text that includes an inputted set of words determined to correspond to the user based on a set of language skills specified by a skill profile of the user.

A twenty-second example provides a carrier medium carrying machine-readable instructions for controlling a machine to carry out the operations (e.g., method operations) performed in any one of the previously described examples.

What is claimed is:

1. A method comprising:
providing, by one or more processors, a language diagnostic application to a device of a user;
generating, by the one or more processors, a skill profile of the user based on output of the provided language diagnostic application, the skill profile specifying a set of language skills that correspond to the user;
determining, by the one or more processors, a set of words that correspond to the user based on the set of language skills specified by the skill profile of the user;
generating, by the one or more processors, custom text that includes the determined set of words by inputting the determined set of words into a learning machine trained based on a reference set of documents to generate custom text based on one or more inputted words; and
presenting, by the one or more processors, the generated custom text that includes the set of words determined based on the set of language skills specified by the skill profile of the user.

2. The method of claim 1, wherein:
the set of language skills specified by the skill profile of the user includes a language skill in which the user is deficient;
the determining of the set of words that correspond to the user includes selecting a word for inclusion in the set of words that correspond to the user based on the language skill in which the user is deficient; and
the generated custom text includes the selected word.

3. The method of claim 1, wherein:
the set of language skills specified by the skill profile of the user includes a language skill that includes a language sub-skill; and
the determining of the set of words that correspond to the user includes:
accessing a database that correlates the language sub-skill with an alphabetic letter; and
selecting a word for inclusion in the set of words that correspond to the user based on the word including the alphabetic letter that is correlated with the language sub-skill by the database.

4. The method of claim 1, wherein:
the set of language skills specified by the skill profile of the user includes a language skill that includes a language sub-skill; and
the determining of the set of words that correspond to the user includes:
accessing a database that correlates the language sub-skill with a phoneme; and
selecting a word for inclusion in the set of words that correspond to the user based on the word including the phoneme that is assigned with the language sub-skill by the database.

5. The method of claim 1, further comprising:
accessing an interest profile of the user, the interest profile specifying a topic that corresponds to the user; and
wherein:
the generating of the custom text includes inputting the topic specified by the interest profile into the trained learning machine; and
the generated custom text includes at least a portion generated by the trained learning machine based on the topic specified by the interest profile of the user.

6. The method of claim 1, wherein:
the generating of the custom text includes selecting a typeface based on the set of language skills specified by the skill profile of the user; and
the generated custom text includes a portion that has the typeface selected based on the set of language skills specified by the skill profile.

7. The method of claim 1, wherein:
the generating of the custom text includes selecting a font size based on the set of language skills specified by the skill profile of the user; and
the generated custom text includes a portion that has the font size selected based on the set of language skills specified by the skill profile.

8. The method of claim 1, wherein:
the generating of the custom text includes selecting a font weight based on the set of language skills specified by the skill profile of the user; and
the generated custom text includes a portion that has the font weight selected based on the set of language skills specified by the skill profile.

9. The method of claim 1, wherein:
the generating of the custom text includes selecting a kerning based on the set of language skills specified by the skill profile of the user; and
the generated custom text includes a portion that has the kerning selected based on the set of language skills specified by the skill profile.

10. The method of claim 1, wherein:
the generated custom text includes a second document generated subsequent to a first document previously generated; and the method further comprises:
performing a linguistic analysis of audio data generated from the user reading aloud the first generated document; and wherein:
the accessing of the skill profile of the user includes updating the skill profile of the user based on the linguistic analysis of the audio data generated from the user reading aloud the first generated document; and
the generated second document is generated by the trained learning machine based on the skill profile updated based on the linguistic analysis.

11. The method of claim 10, wherein:
the determining of the set of words that correspond to the user includes determining a second set of words by updating a first set of words previously determined, the updating of the first set of words being based on the updated skill profile of the user; and
the generated second document is generated by the trained learning machine based on the second set of words determined by the updating of the first set of words.

12. The method of claim 11, wherein:
the generating of the custom text includes inputting the second set of words into the trained learning machine; and
the generated custom text includes the second set of words determined by the updating of the first set of words based on the updated skill profile of the user.

13. A method comprising:
accessing, by one or more processors, a reference set of documents, each document in the reference set containing a corresponding reference story;
training, by the one or more processors, a learning machine to generate custom text based on one or more inputted words and one or more specified topics, the training of the learning machine being based on reference stories contained in the reference set of documents, the trained learning machine being configured to generate custom text based on one or more inputted words and based on a topic specified in an interest profile of a user; and
providing, by the one or more processors, the trained learning machine to a device of the user, the provided trained learning machine configuring the device to generate custom text that includes an inputted set of words determined to correspond to the user based on a set of language skills specified by a skill profile of the user.

14. The method of claim 13, wherein:
the training of the learning machine includes training the learning machine to generate custom text with a portion that has a typeface selected based on the set of language skills specified by the skill profile.

15. The method of claim 13, wherein:
the training of the machine includes training the machine to generate the custom text with a portion that has kerning selected based on the set of language skills specified by the skill profile.

16. A non-transitory machine-readable medium comprising instructions that, when executed by one or more processors of a machine, cause the machine to perform operations comprising:
providing a language diagnostic application to a device of a user;
generating a skill profile of the user based on output of the provided language diagnostic application, the skill profile specifying a set of language skills that correspond to the user;
determining a set of words that correspond to the user based on the set of language skills specified by the skill profile of the user;
generating custom text that includes the determined set of words by inputting the determined set of words into a learning machine trained based on a reference set of documents to generate custom text based on one or more inputted words; and
presenting the generated custom text that includes the set of words determined based on the set of language skills specified by the skill profile of the user.

17. A non-transitory machine-readable medium comprising instructions that, when executed by one or more processors of a machine, cause the machine to perform operations comprising:
accessing a reference set of documents, each document in the reference set containing a corresponding reference story;
training a learning machine to generate custom text based on one or more inputted words and one or more specified topics, the training of the learning machine being based on reference stories contained in the reference set of documents, the trained learning machine being configured to generate custom text based on one or more inputted words and based on a topic specified in an interest profile of a user; and
providing the trained learning machine to a device of the user, the provided trained learning machine configuring the device to generate custom text that includes an inputted set of words determined to correspond to the user based on a set of language skills specified by a skill profile of the user.

18. A system comprising:
one or more processors; and
a memory storing instructions that, when executed by at least one processor among the one or more processors, cause the system to perform operations comprising:
providing a language diagnostic application to a device of a user;
generating a skill profile of the user based on output of the provided language diagnostic application, the skill profile specifying a set of language skills that correspond to the user;
determining a set of words that correspond to the user based on the set of language skills specified by the skill profile of the user;
generating custom text that includes the determined set of words by inputting the determined set of words into a learning machine trained based on a reference set of documents to generate custom text based on one or more inputted words; and
presenting the generated custom text that includes the set of words determined based on the set of language skills specified by the skill profile of the user.

19. A system comprising:
one or more processors; and
a memory storing instructions that, when executed by at least one processor among the one or more processors, cause the system to perform operations comprising:
accessing a reference set of documents, each document in the reference set containing a corresponding reference story;
training a learning machine to generate custom text based on one or more inputted words and one or more specified topics, the training of the learning machine being based on reference stories contained in the reference set of documents, the trained learning machine being configured to generate custom text based on one or more inputted words and based on a topic specified in an interest profile of a user; and
providing the trained learning machine to a device of the user, the provided trained learning machine configuring the device to generate custom text that includes an inputted set of words determined to correspond to the user based on a set of language skills specified by a skill profile of the user.

* * * * *